US008195864B2

(12) United States Patent  
Whitby-Strevens et al.

(10) Patent No.: US 8,195,864 B2
(45) Date of Patent: Jun. 5, 2012

(54) METHODS AND APPARATUS FOR BRIDGED DATA TRANSMISSION AND PROTOCOL TRANSLATION IN A HIGH SERIALIZED DATA SYSTEM

(75) Inventors: Colin Whitby-Strevens, Ben Lomond, CA (US); Michael D. Johas Teener, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 12/291,607

(22) Filed: Nov. 12, 2008

(65) Prior Publication Data

US 2009/0077298 A1 Mar. 19, 2009

Related U.S. Application Data

(62) Division of application No. 10/749,325, filed on Dec. 29, 2003, now Pat. No. 7,581,041.

(51) Int. Cl.
*G06F 13/36* (2006.01)

(52) U.S. Cl. ............ 710/315; 710/38; 710/65; 710/105; 710/305; 710/306; 710/313; 710/314; 710/316

(58) Field of Classification Search .................... 710/20, 710/38, 62, 105, 63, 305, 306, 313, 314, 710/315, 316, 65; 345/501, 530
See application file for complete search history.

(56) References Cited

U.S. PATENT DOCUMENTS

| | | | |
|---|---|---|---|
| 5,155,816 A | 10/1992 | Kohn | |
| 5,208,808 A | 5/1993 | D'Ignazio et al. | |
| 5,293,381 A | 3/1994 | Choy | |
| 5,546,546 A * | 8/1996 | Bell et al. | 710/112 |
| 5,590,378 A | 12/1996 | Thayer et al. | |
| 5,845,152 A | 12/1998 | Anderson et al. | |
| 5,933,612 A * | 8/1999 | Kelly et al. | 710/311 |
| 6,061,746 A * | 5/2000 | Stanley et al. | 710/10 |
| 6,256,700 B1 * | 7/2001 | Sauber | 710/316 |
| 6,301,632 B1 * | 10/2001 | Jaramillo | 710/105 |
| 6,356,968 B1 * | 3/2002 | Kishon | 710/306 |
| 6,370,603 B1 * | 4/2002 | Silverman et al. | 710/72 |
| 6,438,604 B1 | 8/2002 | Kuver et al. | |
| 6,480,909 B1 * | 11/2002 | Chun | 710/38 |
| 6,496,509 B1 * | 12/2002 | Fant | 370/400 |

(Continued)

FOREIGN PATENT DOCUMENTS

EP  1 085 706 A2  3/2001

(Continued)

OTHER PUBLICATIONS

Microsoft Corporation. IPv4 Over IEEE 1394 Protocol Extensions. Dec. 14, 2011.*

(Continued)

*Primary Examiner* — Matthew Spittle
(74) *Attorney, Agent, or Firm* — Gazdzinski & Associates, PC

(57) ABSTRACT

An apparatus for transmitting data across a high-speed serial bus includes an IEEE 802.3-compliant PHY having a GMII interface; an IEEE 1394-compliant PHY in communication with the IEEE 802.3-compliant PHY via a switch; the switch determining whether data transmission is be routed to the IEEE 802.3-compliant PHY or the IEEE 1394-compliant PHY; a first connection, the first connection for transmitting data between a device and the IEEE 802.3-compliant PHY; and a second connection, the second connection for transmitting data between a device and the IEEE 1394-compliant PHY.

56 Claims, 6 Drawing Sheets

U.S. PATENT DOCUMENTS

| | | | |
|---|---|---|---|
| 6,510,473 | B1 | 1/2003 | Voit |
| 6,526,462 | B1 * | 2/2003 | Elabd ............................ 710/242 |
| 6,643,728 | B1 * | 11/2003 | Crutchfield et al. .......... 710/315 |
| 6,728,280 | B1 | 4/2004 | Tatum et al. |
| 6,789,154 | B1 * | 9/2004 | Lee et al. ....................... 710/315 |
| 6,813,651 | B1 * | 11/2004 | Smith et al. ..................... 710/20 |
| 6,871,244 | B1 * | 3/2005 | Cahill et al. .................... 710/62 |
| 6,874,042 | B2 * | 3/2005 | Sauber ............................ 710/38 |
| 6,886,057 | B2 * | 4/2005 | Brewer et al. ................... 710/63 |
| 6,976,102 | B1 * | 12/2005 | Groen et al. .................... 710/72 |
| 7,007,114 | B1 | 2/2006 | White et al. |
| 7,073,008 | B2 * | 7/2006 | Wu et al. ....................... 710/306 |
| 7,139,344 | B2 | 11/2006 | Crutchfield et al. |
| 7,213,096 | B2 * | 5/2007 | Keys et al. .................... 710/313 |
| 7,380,045 | B2 * | 5/2008 | Park et al. ..................... 710/315 |
| 7,467,244 | B2 * | 12/2008 | Kamphausen et al. ......... 710/65 |
| 7,987,489 | B2 * | 7/2011 | Krzyzanowski et al. ....... 725/80 |
| 2001/0047475 | A1 * | 11/2001 | Terasaki ......................... 713/160 |
| 2002/0152346 | A1 | 10/2002 | Stone et al. |
| 2004/0143693 | A1 * | 7/2004 | Hwang .......................... 710/305 |
| 2009/0259777 | A1 * | 10/2009 | Margerm et al. ............... 710/61 |

FOREIGN PATENT DOCUMENTS

EP        1 085 706 A3    10/2002

OTHER PUBLICATIONS

Apple Computer Inc. FireWire 800. Technology Brief. 2003.*
Mbaye et al. Performance of a Firewire-Ethernet Protocols Conversion on an ARM7 Embedded Processor. IEEE. 2003.*
IEEE Computer Society. 802.3 Part 3: Carrier Sense multiple access with collision detection (CSMA/CD) access method and physical layer specifications. Mar. 8, 2002. IEEE, Inc.
IEEE. The Authoritative Dictionary of IEEE Standards Terms. Seventh Edition. Dec. 2000. "data stream".
Wikipedia, the free encyclopedia. FIFO. http://en.wikipedia.org/wiki/FIFO. Page last modified Jul. 9, 2007.
Kim, Dongwook. Gigabit Media Independent Interface. Gigabit Ethernet Network. Feb. 28, 2004.
Hauck et al. 1394c (S800T) symbol encoding for tolerance to single byte errors. Sep. 26, 2003.
Elkeelany, Omar. Extending Quality of Video Streaming with Dynamic Isochrones Resource Mapping to Ethernet Channels. IEEE. Mar. 11, 2007.
Bregni et al., Jitter Testing Technique and Results at VC-4 Desynchronizer Output of SDH Equipment, IEEE International Conference on Communications, vol. 3, pp. 1407-1410, May 12, 1994.
Information technology-Microprocessors systems—Control and Status Registers (CSR) Architecture for microcomputer buses, ANSI/IEEE Standard 1212, The Institute of Electrical and Electronics Engineers, Inc. pp. 1-122, 1994 Edition.
Bregni et al., Jitter Technique and Results at VC-4 Desynchronizer Output of SDH Equipment, IEEE Transactions on Instrumentation and Measurement, vol. 44, Issue 3, pp. 675-678, Jun. 1995.
"IEEE Standard for a High Performance Serial Bus", IEEE Standard 1394-1995, Institute of Electrical and Electronics Engineers, Inc., pp. 1-384, approved Jul. 22, 1996.
Shiwen et al., Parallel Positive Justification in SDH C.sub.—4 Mapping, IEEE International Conference on Communications, vol. 3, pp. 1577-1581, Jun. 12, 1997.
"AV/C Digital Interface Command Set General Specification, Rev. 3.0", 1394 Trade Association, pp. 4-5, 20-34, Apr. 15, 1998.
"Enhancements to the AV/C General Specification 3.0 Version 1.0FC1", 1394 Trade Association, pp. 4, 6-17, Nov. 5, 1998.
"Information Technology-Fibre Channel-Methodologies for Jitter Specification", NCITS TR-25-1999, Jitter Working Group Technical Report, Rev, 10, pp. 1-96, Jun. 9, 1999.
"P1394a Draft Standard for a High Performance Serial Bus (Supplement)", Draft 3.0, Institute of Electrical and Electronics Engineers, Inc., pp. 1-187, Jun. 30, 1999.
"IEEE Standard for a High Performance Serial Bus-Amendment 1", Institute of Electrical and Electronics Engineers, Inc., pp. 1-196, approved Mar. 30, 2000.
P1394b IEEE Draft Standard for a High Performance Serial Bus (High Speed Supplement) P1394b Draft 1.3.3, Institute of Electrical and Electronics Engineers, Inc., pp. 1-408, Nov. 16, 2001.
"IEEE Standard for a High Performance Serial Bus-Amendment 2", Institute of Electrical and Electronics Engineers, Inc., pp. 1-369, 2002, (no. month).

* cited by examiner

US 8,195,864 B2

METHODS AND APPARATUS FOR BRIDGED DATA TRANSMISSION AND PROTOCOL TRANSLATION IN A HIGH SERIALIZED DATA SYSTEM

This application is a divisional of co-owned U.S. patent application Ser. No. 10/749,325 filed Dec. 29, 2003 now U.S. Pat. No. 7,581,041 entitled "1394b S800 over CAT5 Cabling Using Gigabit Ethernet PHY", which is incorporated herein by reference in its entirety.

FIELD OF THE INVENTION

The present invention relates broadly to devices connected to a high-speed serial bus. Specifically, the present invention relates to bridging data transmission between IEEE 1394-compliant devices and Ethernet-compliant devices.

BACKGROUND

A "bus" is a collection of signals interconnecting two or more electrical devices that permits one device to transmit information to one or more other devices. There are many different types of buses used in computers and computer-related products. Examples include the Peripheral Component Interconnect ("PCI") bus, the Industry Standard Architecture ("ISA") bus and the Universal Serial Bus ("USB"), to name a few. Bus operation is usually defined by a standard that specifies various concerns such as the electrical characteristics of the bus, how data is to be transmitted over the bus, how requests for data are acknowledged, and the like. Using a bus to perform an activity, such as transmitting data, requesting data, etc., is generally called running a "cycle." Standardizing a bus protocol helps to ensure effective communication between devices connected to the bus, even if such devices are made by different manufacturers. Any company wishing to make and sell a device to be used on a particular bus, provides that device with an interface unique to the bus to which the device will connect. Designing a device to particular bus standard ensures that device will be able to communicate properly with all other devices connected to the same bus, even if such other devices are made by different manufacturers.

Thus, for example, an internal fax/modem (i.e., internal to a personal computer) designed for operation on a PCI bus will be able to transmit and receive data to and from other devices on the PCI bus, even if each device on the PCI bus is made by a different manufacturer.

Problems occur when devices located on buses or networks using different low-level protocols are made to communicate with each other. One example involves two very popular standards, the IEEE 1394 family of serial bus protocols, and the IEEE 802.3 family of Ethernet network protocols. Despite the fact that there are versions of both protocols that use the same cables and connectors, and both support the higher level "Internet Protocol" (IP), devices implementing the Ethernet-compliant network interface are unable to communicate with devices implementing the 1394-compliant bus interface because of the differences existing between the respective protocols. Because of the large number of existing devices that use one protocol or the other, this communication gap is likely to widen as standards are developed in the two protocols. Thus, there is a heartfelt need for a solution that bridges the communication gap between protocols and effectively allows devices to communicate with each other across different bus or networking architectures.

SUMMARY

In one aspect of the present invention, and apparatus is disclosed. In one embodiment, the apparatus includes: a first interface operating according to a first protocol; at least one second interface, the at least one second interface adapted to operate according to a second protocol, the first interface configured to operate within a first clock domain, and the at least one second interface configured to operate within a second clock domain; a translation apparatus in signal communication with both the first and at least one second interfaces, the translation apparatus adapted to translate between the first and second protocols; wherein the translating apparatus is further adapted to compensate for differences between the first and second clock domains; a bridging apparatus adapted to provide logical network addressing for devices connected to the first interface and the at least one second interface; and apparatus enabling, responsive to a negotiation, the translation apparatus or the bridging apparatus.

In another embodiment, the apparatus includes: a first interface adapted to operate according to a first data protocol; a second interface, the second interface adapted to operate according to a second data protocol that is different than the first data protocol; a translation apparatus in data communication with both the first and second interfaces, the translation apparatus adapted to translate between the first and second data protocols; a bridging apparatus adapted to provide logical network addressing for a first apparatus in data communication with the first interface and a second apparatus in data communication with the second interface; and routing apparatus configured to, responsive to a negotiation sequence, route data via the translation apparatus or the bridging apparatus. The second interface is adapted to detect at least one null symbol, the null symbol being used to at least in part determine symbol synchronization.

In yet another embodiment, the apparatus includes a first interface adapted to operate according to a first data protocol and within a first clock domain; a second interface, the second interface adapted to operate according to a second data protocol that is different than the first data protocol and within a second clock domain; arbitration apparatus in data communication with both the first and second interfaces, the arbitration apparatus adapted to arbitrate transmit and receive operations so as to provide unidirectional data flow between the first interface and the second interface; a bridge apparatus adapted to provide network addressing for a first apparatus in data communication with the first interface and a second apparatus in data communication with the second interface; routing apparatus configured to, responsive to a negotiation sequence, route data via at least one of arbitration apparatus and/or the bridge apparatus; and a translating apparatus in data communication with the first and second interfaces and adapted to compensate for differences between the first and second clock domains.

In another aspect of the present invention, a method for providing data communication between electronic devices is disclosed. In one embodiment, the method includes: providing first and second interfaces, the first interface being associated with a first protocol, the second of the interface being associated with a second protocol, and the second interface being adapted to operate with multiple different protocols including the second protocol; performing a negotiation process; responsive to the negotiation process, either: translating data sent from the first interface to the second interface from the first protocol to the second protocol, or translating data sent from the second interface to the first interface from the second protocol to the first protocol; and arbitrating serial accesses from the first interface to the second interface; or establishing data communication between the first and second interface via a bridge apparatus, the bridge apparatus providing network addressing capabilities for the first and second devices.

In another aspect, a method of communicating data is disclosed. In one embodiment, the communicating is between a first data interface adapted to operate according to a first data protocol and a second data interface adapted to operate according to a second data protocol that is different than the first data protocol, and the method includes: negotiating whether data should be routed over a first path or a second path, and responsive to the negotiating, routing the data via the first path or the second path. In one variant, the first path includes apparatus for arbitration of transmit and receive operations so as to provide unidirectional data flow selectively between the first interface and the second interface, and the second path includes a bridge apparatus adapted to provide networking for a first apparatus in data communication with the first interface, and a second apparatus in data communication with the second interface. In another variant, the routing the data over the bridging apparatus includes: receiving data encoded according to the first data protocol; assembling the data into a plurality of packets via at least one first protocol layer; transmitting the packets to at least one second protocol layer; assembling a plurality of symbols from the received packets; and transmitting the received packets to the second first interface.

Other features and advantages of the present invention will become apparent from reading the following detailed description, when considered in conjunction with the accompanying drawings.

SUMMARY OF THE INVENTION

Various embodiments of the present invention utilize a 1000 BASE-T PHY that transmits and receives at no less than 0.9999 gbit/sec, and a 1394b PHY having a cable interface that utilizes a bit stream rate of no more than 0.98304+100 ppm=0.9831383 gbit/sec. Thus, the fastest S800 1394b transmission rate can be accommodated by the slowest 1000 BASE-T stream.

In an embodiment, the present invention upshifts an S800 1394b stream by inserting an illegal symbol within the transmit stream approximately once for every 59 regular symbols. In an embodiment, the illegal symbol is either all ones or all zeros since those are the furthest Hamming distance from 1394b control symbols or data symbols. In various embodiments, insertion of this illegal symbol can be performed at a fixed rate, or by utilizing a one-symbol FIFO that is fed by the 1394b transmitting port and drained by the 1000 base TX PHY. In this embodiment, when the FIFO underflows, the extra symbol is generated. On receive, the same approach can be followed. In an embodiment, a FIFO is centered at the start of a packet.

In another embodiment of the present invention, the 1000 base-T transmit stream requires a number of Ethernet IDLE symbols to appear periodically. A small transmit FIFO is provided and, when it underflows, transmission of the 1394b symbols is halted and the 1000 base TX PHY is instructed to transmit Ethernet IDLE symbols for 11 Ethernet symbol times. During this time, the transmit FIFO is filling. After the 11 Ethernet symbol times has passed, transmission of 1394b symbols is resumed. Insertion of these idle symbols satisfies a requirement for 1000 base T transmission.

Figure 1:
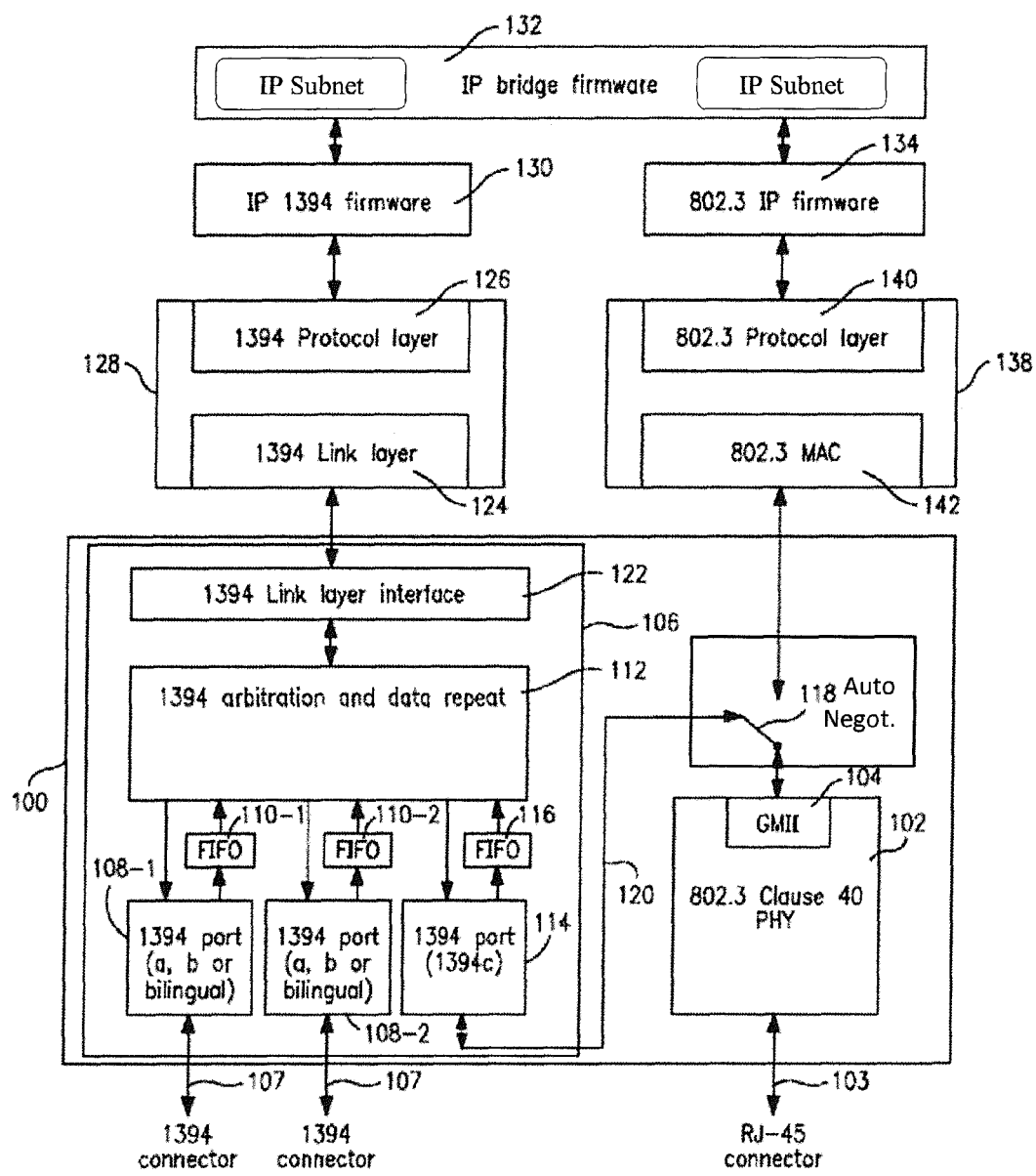
FIG. 1 illustrates in block diagram form structural and function elements in an embodiment.

Directing attention to FIG. 1, a functional representation of an embodiment of the present invention is provided. The functional elements illustrated in FIG. 1 can be incorporated into a node device that communicates over a serial bus as described above to allow a user to implement a variety of Internet-based functions over a 1394-compliant bus architecture. Integrated PHY chip 100 includes 802.3 clause 40 PHY 102 having external connection 103 and GMII interface 104, and integrated 1394 PHY 106, having at least one external connector 107, controllably connected to 802.3 Clause 40 PHY 102. 1394 PHY 106 includes at least one 1394 port 108, each having a FIFO 110 for delivering bits, characters, or symbols to 1394 arbitration and data repeat module 112. Also included in 1394 PHY 106 is port 114, which also communicates bits, characters or symbols to 1394 arbitration and data repeat module 112 via FIFO 116. In an embodiment, FIFO 116 is sized larger than FIFO 110 to accommodate additional latencies experienced on port 114. Port 114 also connects to 802.3 Clause 40 PHY 102 via a switch 118. In an embodiment, switch 118 is controllably set between port 114 and GMII interface 104 according to an autonegotiation process described herein. 1394 arbitration and data repeat module 112 performs bus arbitration as well as routing data received between link layer interface 122 and/or ports 108, 114. Arbitration is handled by module 112 to determine whether PHY 106 is to transmit over a connected serial bus or receive data over the serial bus. Link layer 124 assembles a stream of symbols received over link layer interface 122 into packets that are transmitted forward over protocol layer 126. Conversely, link layer 124 translates packets received from protocol layer 126 into a stream of symbols that can be passed to the link layer interface 122. In an embodiment, link layer 124 and protocol layer 126 are implemented on a shared chip 128. IP 1394 firmware module 130 includes logic for implementing application-specific protocols that transport Internet protocol (IP)-format packets over 1394 hardware and logic. IP bridge firmware module 132 bridges packets transmitted between IP bridge firmware module 132 and implements a separate IP subnet or an 802.3 subnet and bridges communication between these two types of subnets according to IP standards. Alternatively, IP bridge firmware module 132 manages a common subnet between 802.3 Clause 40 PHY 102 and 1394 PHY 106 and ensures that IP addressing of transmitted packets is distinct. The GMII side of the present invention includes 802.3 IP firmware module 134, that performs similar functions for 802.3 Claude 40 PHY 102 as IP 1394 firmware module 130 provides for 1394 PHY 106, and chip 138, containing GMII side 802.3 protocol layer module 140 and 802.3 media access card (MAC) 142, which perform similar functions for the GMII side as 1392 protocol layer 126 and 1394 link layer module 124 perform for the 1394 side, respectively.

Figure 2:
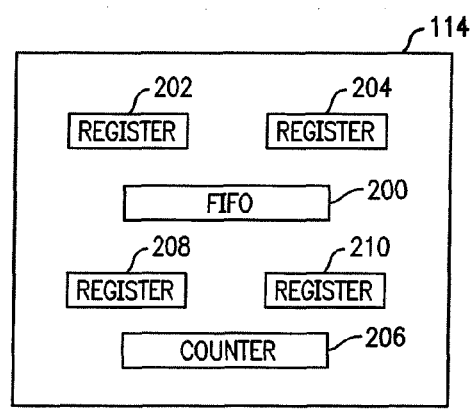
FIG. 2 illustrates functional components included in a port in accordance with an embodiment of the present invention.

Directing attention to FIG. 2, port 114 can be conceptualized has having a 1394 arbitration side of functionality and a GMII side of functionality. In an embodiment, FIFO 200 is included on port 114, and in combination with register 202 and register 204, and modulo 5 counter 206 is used to extract 10-bit symbols from the 1394 side of port 114 and process portions of the extracted symbols into 8-bit characters to be transmitted to GMII interface 104, thus bridging communication between a 1394-compliant system and a gigabit Ethernet systems. In an embodiment, registers 208 and 210 are provided for assembly of 10-bit symbols from 8-bit characters arriving from GMII interface 104 over connection 120. However, in another embodiment, these 10-bit symbols can be assembled using registers 202 and 204.

Figure 3:
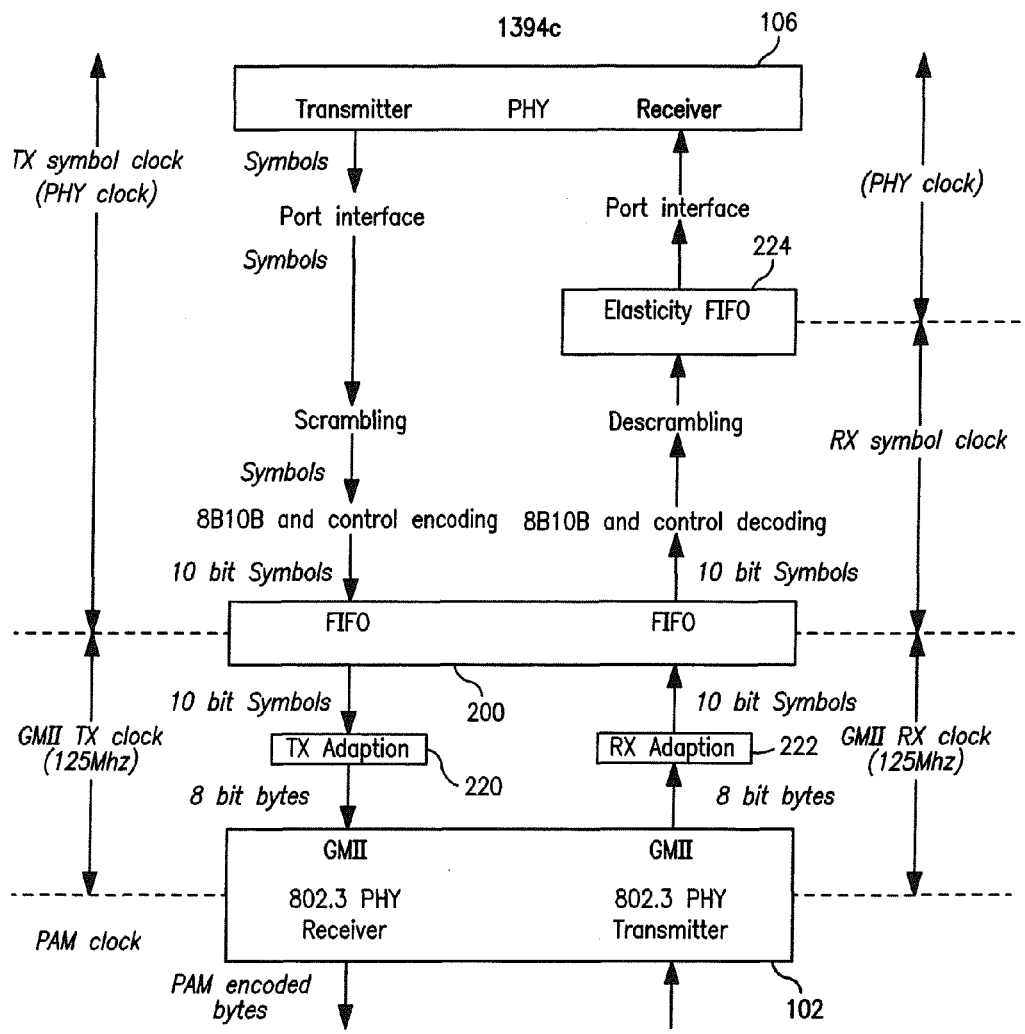
FIG. 3 illustrates in data flow diagram form translation between 8-bit bytes and 10-bit symbols in accordance with an embodiment of the present invention.

Directing attention to FIG. 3, autonegotiation selects whether an Ethernet or a protocol from the 1394 family of protocols is to be used on the connection thus determining the selection made by switch 118. In this embodiment, the 1394 side runs off the same 125 MHz clock as is provided by GMII interface 104. The 1394 side of port 114 generates 10-bit symbols using a 98.304 MHz clock and pushes them into FIFO 200 using this clock. At the other end of FIFO 200, TX Adaptation module 220 extracts the 10-bit symbols from FIFO 200 using the GMII 125 MHz clock and modulo 5 counter 206. Modulo 5 counter 206 supplies values ranging from 0 to 4. If the modulo 5 counter reads 0, then a 10-bit symbol is extracted, but only eight bits of it are used. In an embodiment, the assembled 8-bit character can be retained in register 204 until transmitted to GMII interface 104. The remaining two bits are retained in register 202 for use on the next GMII clock signal. If modulo 5 counter 206 reads 1, then a 10-bit symbol is extracted, but only six bits of it are used and what is transmitted combines the two bits stored in register 202 plus these six extracted bits. This results in four bits being left over, which are stored in register 202. If modulo 5 counter 206 reads 2, then the four left-over bits from register 202 are combined with four bits from the next 10-bit symbol that is extracted from FIFO 200, resulting in six bits being left over from the extracted 10-bit symbol. These remaining six bits are retained in register 202. If modulo 5 counter 206 reads 3, then the six bits in register 202 are combined with two bits from the next extracted symbol, and the remaining eight bits are stored in register 202. If modulo 5 counter 206 reads 4, then no new symbol is extracted, and the eight left over bits are sent over GMII interface 104. If modulo 5 counter 206 has a zero value, then the 1394 side of port 114 does not push a 10-bit number into FIFO 200. PHY 102 ensures that the GMII RX clock is locked to the GMII TX clock. If no symbol is available in FIFO 200, TX Adaptation module 220 inserts an illegal or null 10-bit symbol into FIFO 200.

For translation of data in the opposite direction, where 10-bit symbols are formed from 8-bit characters, synchronization characters (i.e. illegal characters) force the value of modulo 5 counter 206 to zero and hold it there. The first valid 8-bit character that is received via connection 120 is copied into register 208 with the counter value still at zero, so the 1394 side of port 114 takes no action. The next 8-bit character received over connection 120 is placed in register 210. The 1394 side of port 114 assembles a 10-bit symbol by taking the eight bits from register 208, appending two bits from register 210, and treating the resulting 10-bit symbol as if it had been received on 1394b port 108. Most such symbols are pushed into the bport RX FIFO, while others, such as repeated request or control symbols, and illegal symbols are ignored. RX Adaptation module 222 deletes the null or illegal 10-bit symbols, and uses the deletion frequency to control the RX symbol clock phase locked loop. Thus, the RX symbol clock is phase locked to the TX symbol clock. Elasticity FIFO 224 compensates for ppm differences between the two PHY clocks. The resulting 10-bit symbol is pushed into FIFO 116, where conventional 1394b deletable symbols functionality prevents bport FIFO underflow and overflow. In an embodiment FIFO 116 is sized slightly larger than FIFO 110 to compensate for the "4inarushthenawait" symbol arrival characteristics. The remaining bits from register 210 are then stored in register 208, and the next 8-bit byte received is stored in register 210. Assembly of 10-bit symbols continues by using all of the bits from register 208, and appending any bits needed from register 210 to form the 10-bit symbol. This 10-bit symbol process continues until register 210 is emptied upon appending bits, at which point the process repeats itself by storing an 8-bit byte in both registers 208, 210 again.

Figure 4:
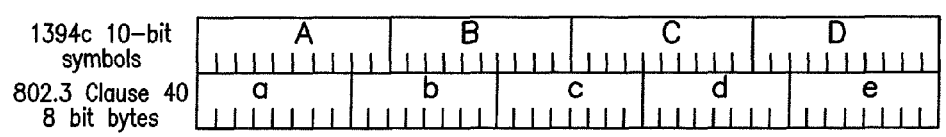
FIG. 4 illustrates the relationship between 10-bit symbols and 8-bit characters.
Figure 5:
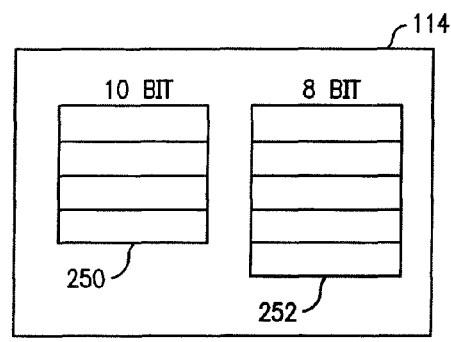
FIG. 5 illustrates functional components in an alternative embodiment of a port in accordance with the present invention.

The relationship between 10-bit symbols and 8-bit characters can be conceptualized as illustrated in FIG. 4. In an embodiment, port 114 can include four 10-bit registers on the 1394 side of port 114 (reference numeral 250), and five 8-bit registers on the GMII side of port 114 (reference numeral 252), as illustrated in FIG. 5. In an embodiment, symbol transmission begins with transmission of an illegal symbol to synchronize four 10-bit registers on the 1394b side of port 114 with the five 8-bit registers on the GMII side of port 114. In this manner, a 10-bit symbol transmitted immediately after an illegal symbol is received as a valid 10-bit symbol. A clock domain crossing transmit FIFO bridges the 1394b PHY clock (running at 98 MHz, in an embodiment) and the 1000 base clock domains. When the clock domain crossing FIFO drains below a predetermined threshold such that it will underflow after the next five symbols are transmitted, an illegal symbol is fed into the clock domain crossing FIFO.

In an embodiment of the present invention, training and operation symbols are transmitted to support scrambler synchronization and a port synchronization handshake and can utilize K28.5 substitution. Rather than GHz logic, or phase locked loops, the present invention utilizes single clock synchronous logic in the receiver on PHY 106. Bytes are presented to port 114 from GMII interface 104 synchronously to GMII interface 104's RX clock (running at 125 MHz, in an embodiment), and, unlike conventional 1394b ports, there is no requirement for any high-speed bit receive logic or clock recovery in port 114. The K28.5 symbol in the IBM 8B10B code is a symbol used in normal operation that contains a special "comma" pattern sequence, denoted as 0011111 or 110000, depending on disparity. When a receiver initializes upon start up, it is unaware of where the 10-bit boundaries occur in an incoming bit stream. But when it recognizes a received K28.5 symbol (the comma sequence), it can use this symbol to determine the 10-bit boundary, and thus acquire symbol synchronization. 1394b-compliant devices perform symbol synchronization by performing K28.5 substitution, replacing D28.0 symbols with K28.5 symbols. The receiver uses the K28.5 symbol to acquire symbol synchronization, and also substitutes back the D28.0 symbol for any K28.5 symbols it finds in the stream. 1394b-compliant devices send a training symbol request as the first symbol on a port. This training symbol is scrambled, and the resulting 8B10B data symbol is transmitted. Scrambling the training symbol ensures that periodically the received data symbol is a D28.0 symbol, and the K28.5 substitution can be performed.

When port 114 has acquired symbol and scrambler synchronization, it changes the symbol it is transmitting to an operation symbol. This operation symbol conveys another request, and is scrambled onto 8B10B data symbols in just the same way. As a result of scrambling, a D28.0 symbol is still due to be transmitted occasionally, and K28.5 substitution is performed.

When port 114 is both transmitting and receiving operation request symbols, it is synchronized to its peer node, and also made aware that the peer node is synchronized to port 114. Port training is now considered complete, and port 114 is ready to transmit requests, control symbols, and data in its support of the 1394 protocols. The 5-to-4 relationship between states on the 1394b side and states on the GMII side of port 114 can be illustrated in FIG. 5. In an embodiment, port 114 utilizes five 8-bit registers (as seen on the GMII side of port 114) a, b, c, d and e, which correspond to four 10-bit registers on the 1394b side of port 114. On the GMII side of port 114, each successive 8-bit character is pushed into register a, b, c, d or e using a value read from modulo 5 counter 206 at intervals denoted by the RX clock on GMII interface 104. On the 1394b side of port 114, 10-bit data is pulled from the GMII side of port 114 using a clock that runs at ⅘ of the GMII RX clock frequency (100 MHz in an embodiment). This clock increments modulo 5 counter 206 for each symbol read. The successive values read are a[7:0]||b[7:6], b[5:0]||c[7:4], c[3:0]||d[7:2] and finally d[1:0] ||e[7:0].

Clocking appears as shown in Table 1.

TABLE 1

| GMII clock | | | | | | | |
|---|---|---|---|---|---|---|---|
| write | a | b | c | d | e | a | b |
| 100 MHz clock | | | | | | | |
| phase offset needed < | | | | | | | |
| 1394b clock | | | | | | | |
| read | | ab | bc | cd | de | ab | |

In an embodiment, illegal symbols are transmitted after the 0 modulo 5 symbols have been transmitted since the last illegal symbol was transmitted, and are also used to synchronize the four 10-bit registers on the 1394b side with the five 8-bit registers on the GMII side. Read and write clock pulses are aligned with the necessary phase offset for the first symbol received after a synchronizing symbol, and the read and write selectors reset to point to register "a" for write and register "ab" for read. The first 10-bit symbol is read one read clock pulse later, after values have been written to both registers a and b. While the four 10-bit registers and five 8-bit registers are synchronizing with each other, no symbols are read out, nor are any 10-bit symbols pushed into the bport RX FIFO using the 100 MHz clock.

The present invention implements the 8-bit GMII interface 104 as a serial interface, by shifting a byte into the 10-bit register on the 1394b side using serial interface FIFO 200. Whenever an illegal symbol is shifted into 10-bit register, it is deleted from FIFO 200. The illegal symbol can be inserted into any stream, and deleted at the other end, even without byte/symbol synchronization.

Figure 6:
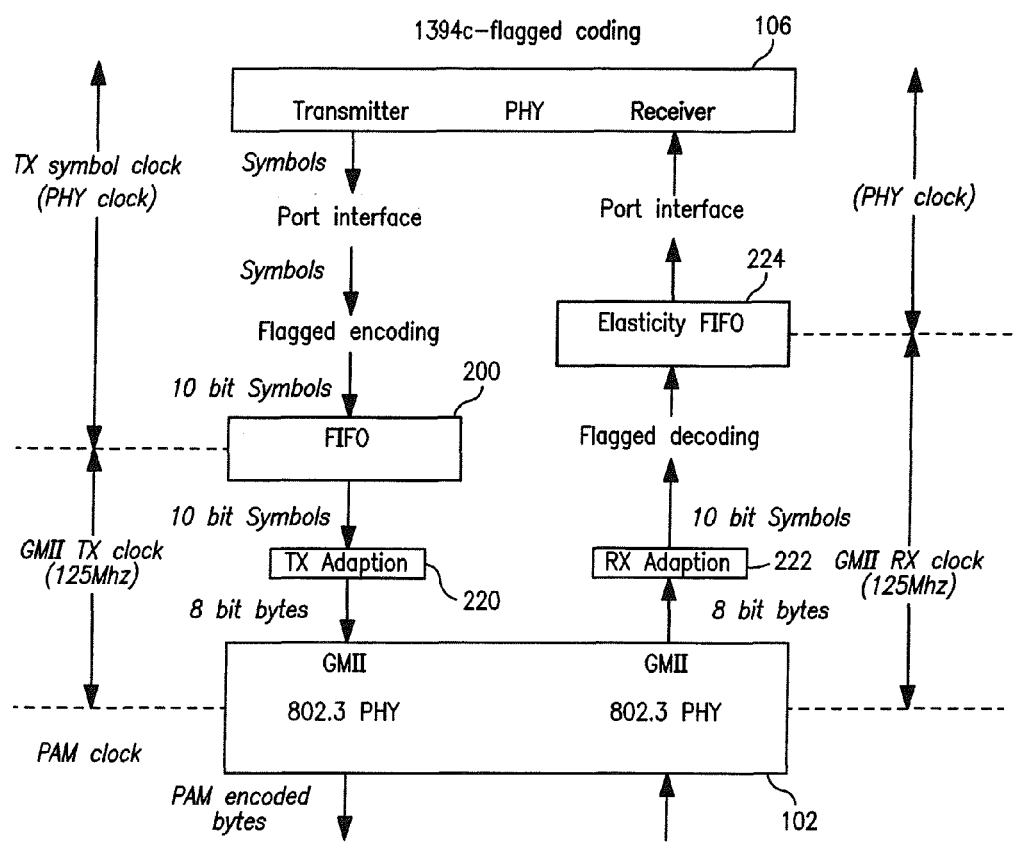
FIG. 6 illustrates in data flow diagram form an embodiment of the present invention that uses 802.3 clause 40 idle bytes instead of illegal symbols to perform translation between 10-bit symbols and 8-bit characters but does so without having to recover an RX receive clock.

Directing attention to FIG. 6, in another embodiment, the present invention can be implemented without RX symbol clock recovery. In this embodiment, the RX clock on PHY 102 is locked to the TX clock on PHY 102. 10-bit symbols are placed in FIFO 200 using flagged encoding. TX adaptation module 220 extracts the 10-bit symbols from FIFO 200 and places them in registers 202, 204. In this embodiment, 802.3-compliant idle bytes are used rather than inserting 10-bit null or illegal symbols. If there is no-symbol available in FIFO 200, then TX Adaptation module 220 de-asserts a transmit enabled state (TX_EN) on GMII interface 104 for 11 clock periods, which causes PHY 102 to insert 802.3-compliant idle bytes. This embodiment thus meets a requirement in the 802.3 standard to periodically insert idle bytes. If there is no symbol in FIFO 200 then TX-EN is de-asserted on PHY 102 for 11 clock periods, which causes PHY 102 to insert the idle bytes. In this embodiment, FIFO 200 is appropriately sized to buffer nine 10-bit symbols that accumulate during the 11 clock periods. On the receive side, RX Adaptation module 222 only takes data from GMII interface 104 when receive data valid (RX_DV) is asserted, which is not asserted when 802.3-compliant idle bytes are being received. Using flagged decoding, 10-bit decoded symbols are pushed into the receive FIFO when available when available. Usually, this occurs on four out of every five clock cycles, but with bursts of 11 clocks with no push when RX_DV is de-asserted. In an embodiment, elasticity FIFO 224 handles both the ppm differences between PHY 106 and PHY 102, as well as the frequency difference between the 802.3 bit rate and the 1394 S800 bit rate. Elasticity FIFO 224 thus must be at least nine symbols deeper than used in 1394b implementations to compensate for the bursty nature of reception. However, in this embodiment, there is no need for PHY 102 to recover the TX symbol clock.

Figure 7:
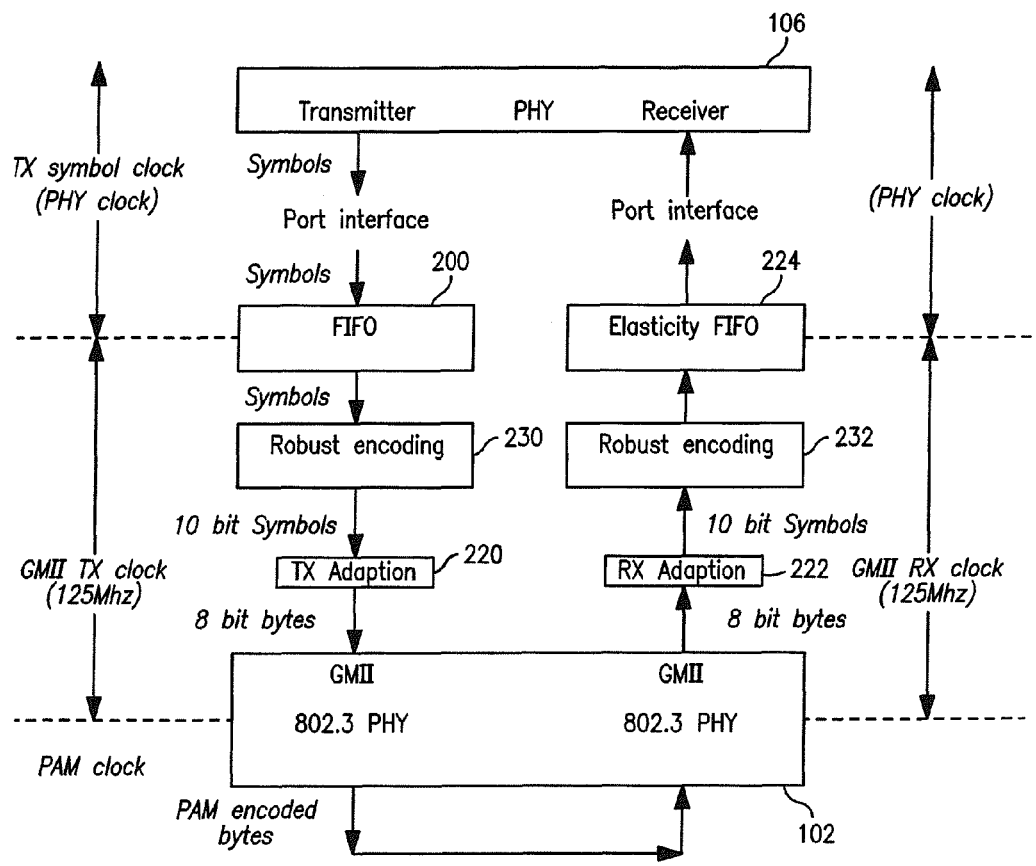
FIG. 7 illustrates in data flow diagram form an embodiment of the present invention that uses 802.3 clause 40 idle bytes instead of illegal symbols to perform translation between 10-bit symbols and 8-bit characters but does so without having to recover a TX symbol clock.

Directing attention to FIG. 7, in yet another embodiment, robust encoding is realized, which implements TX adaptation phase knowledge. PHY 102 ensures that the GMII RX clock is locked to the GMII TX clock. Robust encoding module 230 takes a 10-bit symbol from FIFO 200 on four out of every five GMII TX clocks, and uses TX Adaptation module 220 to determine the encoding to be used, thus generating a 10-bit encoded symbol. TX Adaptation module 220 places the extracted symbol into registers 202, 204 to generate on every GMII TX clock an 8-bit byte as described above. If there is no symbol available in FIFO 200, then robust encoding module 230 instructs TX Adaptation module 220 accordingly. TX Adaptation module 220 de-asserts TX_EN on GMII interface 104 for 11 clock periods, which causes PHY 102 to insert 802.3-compliant idle bytes. FIFO 200 is appropriately dimensioned to buffer nine symbols.

The receive side in this embodiment is similar to the receive side illustrated in FIG. 6 and explained above, with the addition of robust decoding module 232. Robust decoding module 232 decodes the 10-bit symbols that result from RX Adaptation module 222's conversion to 10-bit, encoded symbols from 8-bit, encoded bytes received from PHY 102.

While numerous methods and apparatus for transmitting 1394-compliant symbols using a gigabit Ethernet PHY have been illustrated and described in detail, it is to be understood that many modifications may be made to embodiments of the present invention without departing from the spirit thereof.

What is claimed is:

1. An apparatus comprising:
a first interface operating according to a first protocol, the first interface being configured to operate within a first clock domain;
at least one second interface, the at least one second interface adapted to operate according to a second protocol, the at least one second interface being configured to operate within a second clock domain;

wherein the second protocol comprises a high-speed serialized bus protocol; a translation apparatus in signal communication with both the first and at least one second interfaces, the translation apparatus adapted to translate between the first and second protocols, and to compensate for differences between the first and second clock domains;
a bridging apparatus adapted to provide logical network addressing for devices connected to the first interface and the at least one second interface; and apparatus enabling, responsive to a negotiation, the translation apparatus or the bridging apparatus.

2. The apparatus of claim 1, wherein the high-speed serialized bus protocol comprises a Universal Serial Bus (USB) protocol.

3. The apparatus of claim 1, wherein at least a portion of the second interface carries 8B10B encoded data during operation.

4. The apparatus of claim 1, wherein the bridging apparatus is configured to:
receive an 8B10B symbol at the second interface;
decode the 8B10B symbol to produce a decoded symbol;
generate at least one packet based at least in part on the decoded symbol; and
route the at least one packet via a networking protocol layer.

5. The apparatus of claim 1, wherein the negotiation comprises an auto-negotiation sequence that requires no user intervention to complete.

6. The apparatus of claim 1, wherein the bridging apparatus additionally comprises:
link layer apparatus, the link layer apparatus adapted to decode 8B10B symbols into packets, and encode packets as 8B10B symbols; and
protocol layer apparatus, the protocol layer apparatus adapted to route packets via the logical network;
wherein the at least one second interface is capable of data communication with the protocol layer apparatus via the link layer apparatus.

7. The apparatus of claim 1, wherein the at least one second interface is adapted to detect at least one null symbol, the null symbol being used to at least in part determine symbol synchronization.

8. The apparatus of claim 7, wherein the at least one second interface is additionally adapted to receive 8B10B symbols, and the at least one null symbol comprises a K28.5 comma sequence.

9. The apparatus of claim 1, wherein the translation apparatus is further adapted to insert or delete one or more control symbols conforming to at least one of the first and second protocols.

10. The apparatus of claim 1, wherein the bridging apparatus comprises at least a first protocol layer adapted to transmit or receive data encoded according to the first protocol, and a second protocol layer adapted to transmit or receive data encoded according to the second protocol, the transmission or reception by each of the first and second protocol layers being performed according to a common networking protocol.

11. The apparatus of claim 10, wherein the common networking protocol comprises the Internet Protocol (IP).

12. An apparatus comprising:
a first interface adapted to operate according to a first data protocol;
a second interface, the second interface adapted to operate according to a second data protocol that is different than the first data protocol, the second interface further being adapted to detect at least one null symbol, the null symbol being used to at least in part determine symbol synchronization;
a translation apparatus in data communication with both the first and second interfaces, the translation apparatus adapted to translate between the first and second data protocols;
a bridging apparatus adapted to provide logical network addressing for a first apparatus in data communication with the first interface and a second apparatus in data communication with the second interface; and
routing apparatus configured to, responsive to a negotiation sequence, route data via the translation apparatus or the bridging apparatus.

13. The apparatus of claim 12, wherein the second data protocol comprises a high-speed serialized bus protocol.

14. The apparatus of claim 13, wherein the high-speed serialized bus protocol comprises a Universal Serial Bus (USB) protocol.

15. The apparatus of claim 12, wherein at least a portion of the second interface carries 8B10B encoded data during operation.

16. The apparatus of claim 12, wherein the bridging apparatus is configured to:
receive an 8B10B symbol at the second interface;
decode the 8B10B symbol to produce a decoded symbol;
generate at least one packet based at least in part on the decoded symbol; and
route the at least one packet via a networking protocol layer.

17. The apparatus of claim 12, wherein the negotiation comprises an auto-negotiation sequence that requires no user intervention to complete.

18. The apparatus of claim 12, wherein:
the first interface operates within a first clock domain;
the second interface operates within a second clock domain; and
the translation apparatus is adapted to compensate for differences between the first and second clock domains.

19. The apparatus of claim 12, wherein the bridging apparatus additionally comprises:
link layer apparatus, the link layer apparatus adapted to decode 8B10B symbols into packets, and encode packets as 8B10B symbols; and
protocol layer apparatus, the protocol layer apparatus adapted to route packets via the logical network;
wherein the at least one second interface is capable of data communication with the protocol layer apparatus via the link layer apparatus.

20. The apparatus of claim 12, wherein the second interface is additionally adapted to receive 8B10B symbols, and the at least one null symbol comprises a K28.5 comma sequence.

21. The apparatus of claim 12, wherein the translation apparatus is further adapted to insert or delete one or more control symbols conforming to at least one of the first and second data protocols.

22. The apparatus of claim 12, wherein the bridging apparatus comprises at least a first protocol layer adapted to transmit or receive data encoded according to the first data protocol, and a second protocol layer adapted to transmit or receive data encoded according to the second data protocol, the transmission or reception by each of the first and second protocol layers being performed according to a common networking protocol.

23. The apparatus of claim 12, wherein the difference in the first and second data protocols comprises at least a difference in the respective structures of the data being carried via the protocols.

24. The apparatus of claim 12, wherein the difference in the first and second data protocols comprises at least a difference in the respective speeds with which the data is carried via the protocols.

25. The apparatus of claim 12, wherein the first interface, second interface, translation apparatus, and routing apparatus are all contained within a single integrated circuit.

26. The apparatus of claim 12, wherein the second interface is adapted to operate according to a plurality of protocols, the plurality of protocols comprising at least the second protocol and a third protocol having at least one different speed capability than the second protocol.

27. The apparatus of claim 12, further comprising an arbitration apparatus in data communication with the second interface and the translation apparatus, the arbitration apparatus adapted to provide arbitrated, unidirectional data flow between the second interface and the first interface via at least the translation apparatus when the routing apparatus routes the data via the translation apparatus.

28. A method for providing data communication between electronic devices, the method comprising:
    providing first and second interfaces, the first interface being associated with a first protocol, the second of the interface being adapted to operate with multiple different protocols including a second protocol;
    performing a negotiation process; and
    responsive to the negotiation process, determining a path that data should be routed over, the path selected from at least a first path and a second path;
    the first path comprising:
        translating data sent from the first interface to the second interface from the first protocol to the second protocol, and translating data sent from the second interface to the first interface from the second protocol to the first protocol; and
        arbitrating serial accesses from the first interface to the second interface;
    the second path comprising:
        establishing data communication between the first and second interface via a bridge apparatus, the bridge apparatus providing network addressing capabilities for the first and second devices.

29. The method of claim 28, wherein the act of establishing communication additionally comprises the steps of:
    receiving an 8B10B symbol at the second interface;
    decoding the 8B10B symbol;
    generating at least one packet; and
    routing the at least one packet via a networking protocol layer.

30. The method of claim 28, wherein the establishing communication via a bridge apparatus additionally comprises managing a first subnet and a second subnet, the first and second subnets coupled to the first and second interfaces, respectively.

31. The method of claim 28, wherein the act of translating provides arbitrated, substantially unidirectional data flow.

32. The method of claim 28, wherein the negotiation process comprises an auto-negotiation sequence that occurs without any manual configuration from a user.

33. The method of claim 28, further comprising determining, using at least the second interface, which of the multiple different protocols should be used by the second interface.

34. The method of claim 28, wherein the translating comprises:
    translating data rendered in the first or second protocol to a third protocol; and
    subsequently translating the data rendered in the third protocol to the second or first protocol, respectively.

35. The method of claim 28, wherein the bridge apparatus comprises at least a first protocol layer adapted to transmit or receive data encoded according to the first data protocol, and a second protocol layer adapted to transmit or receive data encoded according to the second data protocol, the transmission or reception by each of the first and second protocol layers being performed according to a common networking protocol.

36. An apparatus comprising:
    a first interface adapted to operate according to a first data protocol and within a first clock domain;
    a second interface, the second interface adapted to operate according to a second data protocol that is different than the first data protocol and within a second clock domain;
    wherein the second data protocol comprises a high-speed serialized bus protocol;
    arbitration apparatus in data communication with both the first and second interfaces, the arbitration apparatus adapted to arbitrate transmit and receive operations so as to provide unidirectional data flow between the first interface and the second interface;
    a bridge apparatus adapted to provide network addressing for a first apparatus in data communication with the first interface and a second apparatus in data communication with the second interface;
    routing apparatus configured to, responsive to a negotiation sequence, route data via at least one of arbitration apparatus and/or the bridge apparatus; and
    a translating apparatus in data communication with the first and second interfaces and adapted to compensate for differences between the first and second clock domains.

37. The apparatus of Claim 36, wherein the high-speed serialized bus protocol comprises a Universal Serial Bus (USB) protocol.

38. The apparatus of claim 36, wherein at least a portion of the second interface carries 8B10B encoded data during operation.

39. The apparatus of claim 36, wherein the bridge apparatus is configured to:
    receive an 8B10B symbol at the second interface;
    decode the 8B10B symbol to produce a decoded symbol;
    generate at least one packet based at least in part on the decoded symbol; and
    route the at least one packet via a networking protocol layer.

40. The apparatus of claim 36, wherein the negotiation comprises an autonegotiation sequence that requires no user intervention to complete.

41. The apparatus of claim 36, wherein the bridge apparatus additionally comprises:
    link layer apparatus, the link layer apparatus adapted to decode 8B10B symbols into packets, and encode packets as 8B10B symbols; and
    protocol layer apparatus, the protocol layer apparatus adapted to route packets via the network;
    wherein the at least one second interface is capable of data communication with the protocol layer apparatus via the link layer apparatus.

42. The apparatus of claim 36, wherein the second interface is adapted to detect at least one null symbol, the null symbol being used to at least in part determine symbol synchronization.

43. The apparatus of claim 42, wherein the second interface is additionally adapted to receive 8B10B symbols, and the at least one null symbol comprises a K28.5 comma sequence.

44. The apparatus of claim 36, further comprising a translation apparatus adapted to insert or delete one or more control symbols conforming to at least one of the first and second data protocols.

45. The apparatus of claim 36, wherein the bridge apparatus comprises at least a first protocol layer adapted to transmit or receive data encoded according to the first data protocol, and a second protocol layer adapted to transmit or receive data encoded according to the second data protocol, the transmission or reception by each of the first and second protocol layers being performed according to a common networking protocol.

46. The apparatus of claim 36, wherein the difference in the first and second data protocols comprises at least a difference in the respective structures of the data being carried via the protocols.

47. The apparatus of claim 36, wherein the difference in the first and second data protocols comprises at least a difference in the respective speeds with which the data is carried via the protocols.

48. The apparatus of claim 36, wherein the first interface, second interface, arbitration apparatus, and routing apparatus are all contained within a single integrated circuit.

49. The apparatus of claim 36, wherein the second interface is adapted to operate according to a plurality of protocols, the plurality of protocols comprising at least the second protocol and a third protocol having at least one different speed capability than the second protocol.

50. A method of communicating data between a first data interface adapted to operate according to a first data protocol and a second data interface adapted to operate according to a second data protocol that is different than the first data protocol, comprising:
    negotiating whether data should be routed over a first path or a second path, the first path comprising apparatus for arbitration of transmit and receive operations so as to provide unidirectional data flow selectively between the first interface and the second interface, the second path comprising a bridge apparatus adapted to provide networking for a first apparatus in data communication with the first interface, and a second apparatus in data communication with the second interface;
    wherein routing the data over the bridging apparatus comprises:
        receiving data encoded according to the first data protocol;
        assembling the data into a plurality of packets via at least one first protocol layer;
        transmitting the packets to at least one second protocol layer;
        assembling a plurality of symbols from the received packets; and
        transmitting the received packets to the second first interface; and
    responsive to the negotiating, routing the data via the first path or the second path.

51. The method of claim 50, further comprising translating between the first and second data protocols when the data is routed over the first path.

52. The method of claim 51, wherein the translating between the first and second data protocols comprises changing at least one data structure between the first and second protocols.

53. The method of claim 51, wherein the translating between the first and second data protocols comprises changing at least one data speed between the first and second protocols.

54. The method of claim 50, wherein the second protocol comprises a high-speed serialized protocol.

55. A method for providing data communication between electronic devices, the method comprising:
    providing first and second interfaces, the first interface being associated with a first protocol, the second of the interface being adapted to operate with multiple different protocols including a second protocol;
    performing a negotiation process; and
    responsive to the negotiation process, determining a path that data should be routed over, the path selected from at least a first path and a second path;
    the first path comprising:
        translating data sent from the first interface to the second interface from the first protocol to the second protocol, and translating data sent from the second interface to the first interface from the second protocol to the first protocol; and
        arbitrating serial accesses from the first interface to the second interface; the second path comprising:
        establishing data communication between the first and second interface via
    a bridge apparatus, the bridge apparatus providing network addressing capabilities for the first and second devices, wherein establishing the data communication provides substantially simultaneous, bi-directional data flow.

56. A method for providing data communication between electronic devices, the method comprising:
    providing first and second interfaces, the first interface being associated with a first protocol, the second of the interface being adapted to operate with multiple different protocols including a second protocol;
    performing a negotiation process; and
    responsive to the negotiation process, determining a path that data should be routed over, the path selected from at least a first path and a second path;
    the first path comprising:
        translating data sent from the first interface to the second interface from the first protocol to the second protocol, and translating data sent from the second interface to the first interface from the second protocol to the first protocol,
    wherein the translating comprises:
        translating data rendered in the first or second protocol to a third protocol, where the third protocol comprises a high-speed serialized bus protocol; and
        subsequently translating the data rendered in the third protocol to the second or first protocol, respectively; and
        arbitrating serial accesses from the first interface to the second interface;
    the second path comprising:
        establishing data communication between the first and second interface via a bridge apparatus, the bridge apparatus providing network addressing capabilities for the first and second devices.

* * * * *

UNITED STATES PATENT AND TRADEMARK OFFICE
CERTIFICATE OF CORRECTION

PATENT NO.        : 8,195,864 B2                                         Page 1 of 1
APPLICATION NO.   : 12/291607
DATED             : June 5, 2012
INVENTOR(S)       : Colin Whitby-Strevens and Michael D. Johas Teener It is certified that error appears in the above-identified patent and that said Letters Patent is hereby corrected as shown below:

On the Title Page, Item (54) and in the Specification, Column 1, Line 3, Title,

Currently Reads:
METHODS AND APPARATUS FOR BRIDGED DATA TRANSMISSION AND PROTOCOL TRANSLATION IN A HIGH SERIALIZED DATA SYSTEM Should Read:
METHODS AND APPARATUS FOR BRIDGED DATA TRANSMISSION AND PROTOCOL TRANSLATION IN A HIGH-SPEED SERIALIZED DATA SYSTEM On the Title Page, Item (57) ABSTRACT:

Currently Reads:
An apparatus for transmitting data across a high-speed serial bus includes an IEEE 802.3-compliant PHY having a GMII interface; an IEEE 1394-compliant PHY in communication with the IEEE 802.3-compliant PHY via a switch; the switch determining whether data transmission is be routed to the IEEE 802.3-compliant PHY or the IEEE 1394-compliant PHY; a first connection, the first connection for transmitting data between a device and the IEEE 802.3-compliant PHY; and a second connection, the second connection for transmitting data between a device and the IEEE 1394-compliant PHY.

Should Read:
An apparatus for transmitting data across a high-speed serial bus includes an IEEE 802.3-compliant PHY having a GMII interface; an IEEE 1394-compliant PHY in communication with the IEEE 802.3-compliant PHY via a switch; the switch determining whether data transmission is to be routed to the IEEE 802.3-compliant PHY or the IEEE 1394-compliant PHY; a first connection, the first connection for transmitting data between a device and the IEEE 802.3-compliant PHY; and a second connection, the second connection for transmitting data between a device and the IEEE 1394-compliant PHY.

Signed and Sealed this
Twenty-third Day of September, 2014

Michelle K. Lee
*Deputy Director of the United States Patent and Trademark Office*